United States Patent [19]

Hannya et al.

[11] Patent Number: 4,934,101
[45] Date of Patent: Jun. 19, 1990

[54] AUTOMOTIVE DOOR

[75] Inventors: Shuichi Hannya, Chigasaki; Nozomi Iida, Hadano, both of Japan

[73] Assignee: Nissan Motor Co., Ltd., Japan

[21] Appl. No.: 296,764

[22] Filed: Jan. 13, 1989

[30] Foreign Application Priority Data

Jan. 14, 1988 [JP] Japan .................................. 63-6386

[51] Int. Cl.5 ............................................... B60J 5/04
[52] U.S. Cl. ..................................... 49/502; 49/441; 49/488
[58] Field of Search .................. 49/502, 441, 440, 488, 49/374, 375, 376, 377, 378

[56] References Cited

U.S. PATENT DOCUMENTS

| | | | |
|---|---|---|---|
| 4,454,688 | 6/1984 | Rest et al. ............................. | 49/502 |
| 4,614,061 | 9/1986 | Brocke ................................. | 49/440 |
| 4,649,668 | 3/1987 | Skillen et al. ........................ | 49/374 |
| 4,689,916 | 9/1987 | Shimizu .............................. | 49/441 X |
| 4,800,681 | 1/1989 | Skillen et al. ...................... | 49/502 X |

FOREIGN PATENT DOCUMENTS 62-115214  7/1987  Japan .

Primary Examiner—Philip C. Kannan
Attorney, Agent, or Firm—Leydig, Voit & Mayer

[57] ABSTRACT

A motor vehicle door is disclosed wherein a finisher includes a housing having a groove fixedly receiving a window panel run channel defining portion of a weatherstrip.

11 Claims, 4 Drawing Sheets

AUTOMOTIVE DOOR

BACKGROUND OF THE INVENTION

The present invention relates to a motor vehicle door, and more particularly to an automotive door.

Automotive doors are known which are designed to provide a flush surface between an outboard surface of a window panel in its lifted position and the adjacent outboard surface of the door. A typical one of such known automotive doors is shown in FIGS. 4, 5, and 6. Referring to FIGS. 4, 5, and 6, in this known automotive door, a window panel 13 is moved upward by a window regulator toward a lifted position and moved in a laterally outboard direction immediately before reaching the lifted position. Thus, the window panel 13 is pressed into firm engagement with a weatherstrip 11 at an outboard lip 11a of a channel portion 11A thereof, reducing discontinuity between the outboard surface of the window panel and the adjacent outboard surface of the door. The weatherstrip 11 is made of an elastomer, such as a rubber, and mounted along a window aperture defining edge of a window frame portion 12a integrally formed with a door panel assembly 12 including an outer panel and an inner door panel. The outer and inner panels have flanges 12b extending from the edge into the window aperture. The weatherstrip 11 is fixedly attached to the flanges 12b, and the channel portion 11A thereof defines a window glass run channel adapted to receive and guide a rear edge portion 13a of the window pane 13. A side finisher 14 is secured to the door outer panel of the window frame portion 12a and prevents the outboard lip 11a from deforming outboard when the window panel 13 is pressed against the outboard lip 11a. The weatherstrip 11 includes an upper portion 11B adapted to sealably contact with an upper edge portion of the window panel 13. The channel portion 11A includes an inboard lip portion 11c and the upper portion 11B includes a lip 11d. When the window panel 13 is moved to the lifted position, the lips 11c and 11d sealably contact with an inboard surface of the window panel 13. In FIG. 6, the reference numeral 15 denotes a glass retainer. This automotive door is disclosed in JP-U 62-115214.

The position of the window panel 13 relative to the channel portion 11A is variable depending on degree of accuracy which the flanges 12b are processed with and degree of accuracy which the side finisher 14 is assembled with the frame portion 12a. The flanges 12b and side finisher 14 are large in dimension, so that a variation in processing the flanges 12b and a variation in assembling the side finisher with the window frame portion 12a create a problem that the window panel 13 does not completely close the window aperture even when it is moved to the lifted position. More particularly, if the side finisher 14 is assembled to take a position as illustrated by the phantom line in FIG. 5, the upper edge portion 13b of the window panel 13 will assume a position as illustrated by the phantom line in FIG. 6 when it is moved toward the lifted position. In this case, the upper edge portion 13b engages the glass retainer with the inboard surface thereof disengaged from the lip 11d when the window glass is in the lifted position, thus failing to make a seal around the upper edge portion 13b of the window glass 13. If, due to a manufacturing variation, the flanges 12b extends inboard of the vehicle to take a position as illustrated by the phantom line in FIG. 5 and thus the channel portion 11A takes a position as illustrated by the phantom line in FIG. 5, the upper edge portion 13b of the window panel 13 assumes a position as illustrated by the broken line in FIG. 6 when it is moved toward the lifted position. In this case, the upper edge portion 13b engages the base which the lip 11d extends from, and thus the window glass 13 is not moved to the lifted position, failing to completely close the window aperture. If the channel portion 11A is disposed at the position as illustrated by the phantom line in FIG. 5, the inboard lip 11c fails to contact with the inboard surface of the window panel 13.

In addition to the above-mentioned problem, there is a problem that it is difficult to reduce a variation in distance between the outboard surface of the window panel 13 in the lifted position and the adjacent outboard surface of the door, degrading the external appearance and quality.

An object of the present invention is to improve a motor vehicle door such that even if there are a variation in processing component parts of the door structure and a variation in assembling them, the finally assembled product is free from the above-mentioned problem that the window is not completely closed nor a seal between the window panel and the window frame fails to be made, and a distance between the outboard surface of the window panel and the adjacent outboard surface of the door is maintained.

SUMMARY OF THE INVENTION

According to the present invention, there is provided a motor vehicle door, comprising:
a window panel;
a door structure;
a finisher secured to said door structure,
a weatherstrip including a channel portion defining a window panel run channel adapted to receive and guide said window panel when said window panel is moved toward a lifted position;
wherein said finisher includes a housing having a groove, and said housing is so constructed and arranged as to fixedly hold said channel portion of said weatherstrip in said groove therein.

Since the channel portion defining the window panel run channel is fixedly held by the housing of the finisher instead of the door structure, the position of the window glass relative to the door structure can be easily adjusted by varying the position where the finisher is secured to the door structure.

DETAILED DESCRIPTION OF THE INVENTION

Figure 1:
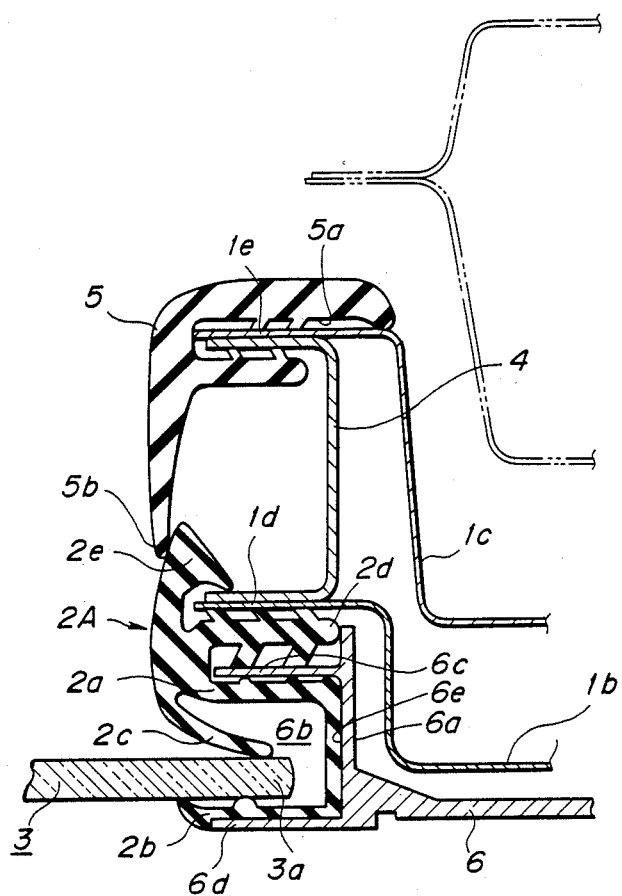
FIG. 1 is an enlarged fragmentary view of a section taken through the line I—I in FIG. 2.
Figure 2:
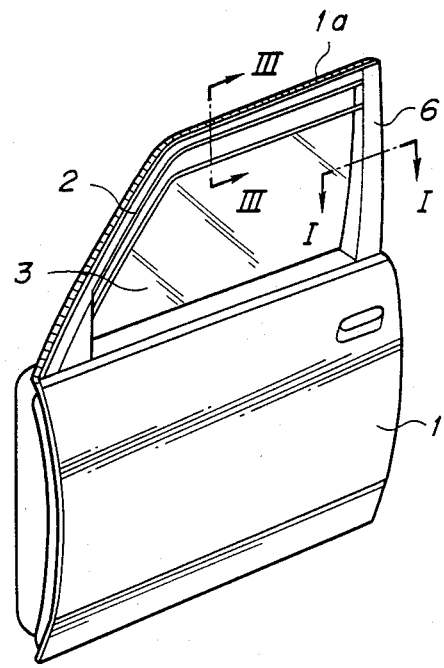
FIG. 2 is a perspective view of a motor vehicle door embodying the present invention.
Figure 3:
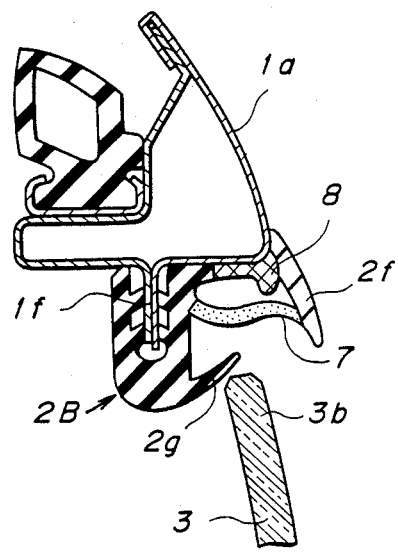
FIG. 3 is an enlarged fragmentary view of a section taken through the line III—III in FIG. 2.
Figure 4:
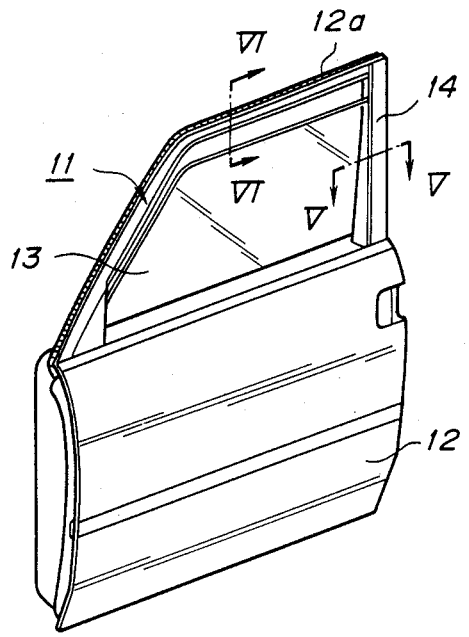
FIG. 4 is a perspective view of a motor vehicle door embodying the prior art discussed before.
Figure 5:
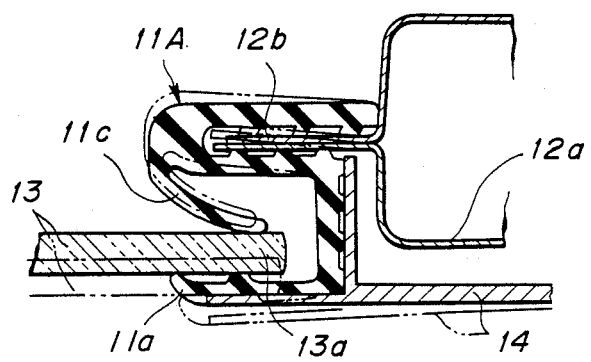
FIG. 5 is an enlarged fragmentary view of a section taken through the line V—V in FIG. 4.
Figure 6:
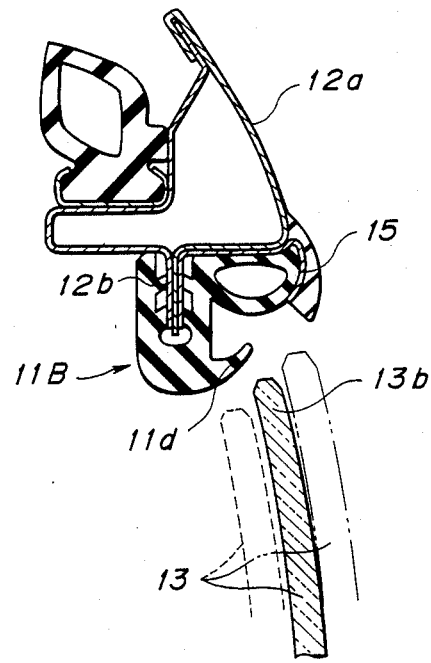
FIG. 6 is an enlarged fragmentary view of a section taken through the line VI—VI in FIG. 4.

Referring to the accompanying drawings, and more particularly to FIGS. 1 to 3 thereof, a preferred embodiment according to the present invention is described. In this embodiment, the present invention is embodied in a so-called "full door" which includes a window frame section 1a integrally formed with a door panel structure 1 (see FIG. 2).

Referring to FIG. 2, arranged along a window aperture defining edge of the frame section 1a is a weatherstrip 2 made of an elastomer, such as a rubber. As best seen in FIG. 1, the door structure includes an outer panel 1b and an inner panel 1c. The outer and inner panels 1b and 1c have flanges 1e and 1d spaced from each other and extending in parallel. A channel-shaped cross member 4 interconnects the flanges 1e and 1d to bridge therebetween. A finisher 6, which is a product made by die-casting, is secured to the door structure in a known manner. The finisher 6 includes a housing 6a. The above-mentioned flanges 1d and 1e are disposed inboard of the housing 6a of the finisher 6 with its outer panel 1d spaced from the housing 6a.

As shown in FIGS. 1 and 3, the weatherstrip 2 includes a generally vertically extending side section 2A and a generally horizontally extending upper section 2B. As readily seen from FIGS. 1 and 2, the finisher 6 extends along the side section 2A of the weatherstrip 2. As seen in FIG. 1, the housing 6a of the finisher 6 has a groove 6b and includes two side walls 6c and 6d and a bottom wall 6e. The side walls and bottom wall 6c, 6d, and 6e cooperate with each other to define the groove 6b. The side section 2A includes a base channel portion 2a fixedly received in the groove 6b of the housing 6a. The channel portion 2a defines a window panel run channel to receive and guide a rear edge portion 3a of a window panel 3 when the window panel 3 is moved toward a lifted position. In the illustrated position in FIG. 1, an integral outboard lip 2b extending from the channel portion 2a sealably contacts with an outboard surface of the window panel 3, and an integral inboard lip 2c extending from the channel portion 2a sealably contacts with an inboard surface of the window panel 3. The width of the channel portion 2a is sufficiently greater than the width of the window panel 3. The side section 2A of the weatherstrip also includes an integral conceal lip 2e extending inboard from the channel portion 2a to sealably contact with that portion of the cross member 4 which is disposed on the flange 1d of the outer panel 1b. The side section 2A also includes an integral tongue 2d disposed between the side wall 6c of the housing 6a and the flange 1d of the outer panel 1b. The tongue 2d is serrated to increase seal contact with the housing 6a and to increase seal contact with the flange 1d of the outer panel 1b. A welt 5 extends to conceal the cross member 4 and the flanges 1d and 1e. The welt 5 is formed with a serrated groove 5a receiving the flange 1e and that portion of the cross member 4 which is disposed on the flange 1e. The welt 5 has a lip 5b sealably contact with the side section 2A of the weatherstrip 1.

As best seen in FIG. 3, an upper edge portion 3b of the window glass 3 is sealably engaged by the upper section 2B of the weatherstrip 2. The upper section 2B includes an integral inboard lip 2g adapted to sealably contact with the inboard surface of the window panel 3, and an outboard lip 2f. A web 7 made of a relatively soft rubber extends to the outboard lip 2f. The reference numeral 8 is a retainer projection made of a relatively hard rubber.

With the door structure previously described, when it is moved toward the lifted position, the window panel 3 is urged in a lateral outboard direction into firm engagement with the outboard lip 2b immediately before it reaches the lifted position. Thus, the outboard surface of the window panel 3 contacts firmly with the outboard lip 2b. Since this side finisher 6 is made by a precision processing, such as a die-casting, and thus the width of the groove 6b of the housing 6a is subject to the least tolerance, the outboard and inboard lips 2b and 2c will assume their correct relationship only by fixedly securing the channel portion 2a into the groove 6b of the housing 6a, and the subsequent adjustment is easily made by adjusting the position of the finisher 6 relative to the door structure. Therefore, the outboard surface of the window panel 3 is kept in sealing engagement with the outboard lip 2b when the window panel 3 takes the lifted position thereof, and the distance between the outboard surface of the window panel 3 and the outboard surface of the side finisher 6 is kept at a designed value, thus minimizing the manufacturing variations.

The adjustment of the window glass 3 relative to the upper section 2B of the weatherstrip can be made easily by adjusting the position of the finisher 6 relative to the door structure. Thus, the upper edge portion 3b of the window glass 3 can assume the correct relationship with the seal 2f and the retainer projection 8.

In the previously described embodiment, the present invention is applied to the so-called full door, it may be applied to a door with a sash-type window frame.

What is claimed is:

1. A motor vehicle door, comprising:
   a window panel;
   a door structure;
   a finisher secured to said door structure; and
   a weatherstrip including a channel portion defining a window panel run channel adapted to receive and guide said window panel when said window panel is moved toward a lifted position;
   said finisher including a housing having a groove which receives said channel portion of said weatherstrip, said channel portion being fixedly held in said groove by said housing.

2. A motor vehicle door as claimed in claim 1, wherein said finisher is die-cast.

3. A motor vehicle door as claimed in claim 1, wherein said weatherstrip includes an outboard lip extending from said channel portion and adapted to sealably contact an outboard surface of said window glass, and an inboard lip extending from said channel portion and adapted to sealably contact an inboard surface of said window glass.

4. A motor vehicle door, comprising:
   a window panel;
   a door structure;
   a finisher secured to said door structure, said finisher including a housing having a groove; and
   a weatherstrip including a channel portion defining a window panel run channel adapted to receive and guide said window panel when said window panel is moved toward a lifted position;
   said housing of said finisher including two side walls having interposed therebetween said channel portion of said weather strip and a bottom wall, said two side walls and said bottom wall cooperating with each other to define said groove, whereby said housing fixedly holds said channel portion of said weatherstrip in said groove.

5. A motor vehicle door as claimed in claim 4, wherein said weatherstrip includes an outboard lip extending from said channel portion and adapted to sealably contact an outboard surface of said window glass, and an inboard lip extending from said channel portion and adapted to sealably contact an inboard surface of said window glass.

6. A motor vehicle door, comprising:
a window panel;
a door structure;
a finisher secured to said door structure;
a weatherstrip including a channel portion defining a window panel run channel adapted to receive and guide said window panel when said window panel is moved toward a lifted position;
said finisher including a housing having a groove, said housing receiving said channel portion of said weatherstrip in said groove therein,
said door structure including an outer panel and an inner panel, said outer panel and said inner panel having flanges disposed inboard of said housing of said finisher, said flanges being spaced from each other and extending in parallel, and said door structure including a cross member interconnecting said flanges to bridge therebetween.

7. A motor vehicle door as claimed in claim 6, wherein said weatherstrip includes an outboard lip extending from said channel portion and adapted to sealably contact with an outboard surface of said window glass, and an inboard lip extending from said channel portion and adapted to sealably contact an inboard surface of said window glass.

8. A motor vehicle door as claimed in claim 6, wherein said weatherstrip includes a conceal lip extending from said channel portion inboard to sealably contact with that portion of said cross member which is disposed on said flange of said outer panel.

9. A motor vehicle door as claimed in claim 8, wherein said flange of said outer panel is disposed inboard of said housing of said finisher and spaced therefrom, and said weatherstrip includes a tongue disposed between said housing and said flange of said outer panel.

10. A motor vehicle door as claimed in claim 9, wherein said tongue is serrated to increase seal contact with said housing and to increase seal contact with said flange of said outer panel.

11. A motor vehicle door as claimed in claim 10, further including a welt formed with a serrated groove for receiving said flange of said inner panel, said welt extending toward said flange of said outer panels and contacting said conceal lip to conceal said cross member.

* * * * *